Nov. 8, 1960 P. F. RICHARDSON 2,959,434
SEAL BETWEEN A SHAFT AND A HOLLOW MEMBER
Filed Nov. 7, 1957 3 Sheets-Sheet 1

INVENTOR.
Pierce F. Richardson
BY Paul O. Pippel
Atty

United States Patent Office 2,959,434
Patented Nov. 8, 1960

2,959,434

SEAL BETWEEN A SHAFT AND A HOLLOW MEMBER

Pierce F. Richardson, North Barrington, Ill., assignor to International Harvester Company, Chicago, Ill., a corporation of New Jersey Filed Nov. 7, 1957, Ser. No. 695,010

2 Claims. (Cl. 286—11.15)

This invention relates to a seal between a shaft and a hollow member disposed on the shaft.

An object of the invention is to provide a seal that eliminates the use of diaphragms which are unsatisfactory because of frequent breakage.

Another object of the invention is to provide a seal in which all parts are small and can be easily replaced thus eliminating the necessity of having to replace large expensive parts.

A further object of the invention is to provide a seal that affords large surfaces where there is a lot of foreign matter present resulting in less wear of the parts.

The foregoing and other objects of the invention will be apparent from the construction and arrangement illustrated in the accompanying drawings wherein:

Figure 4 is a plan sectional view taken on the line 4—4 of Figure 3.

Figure 1:
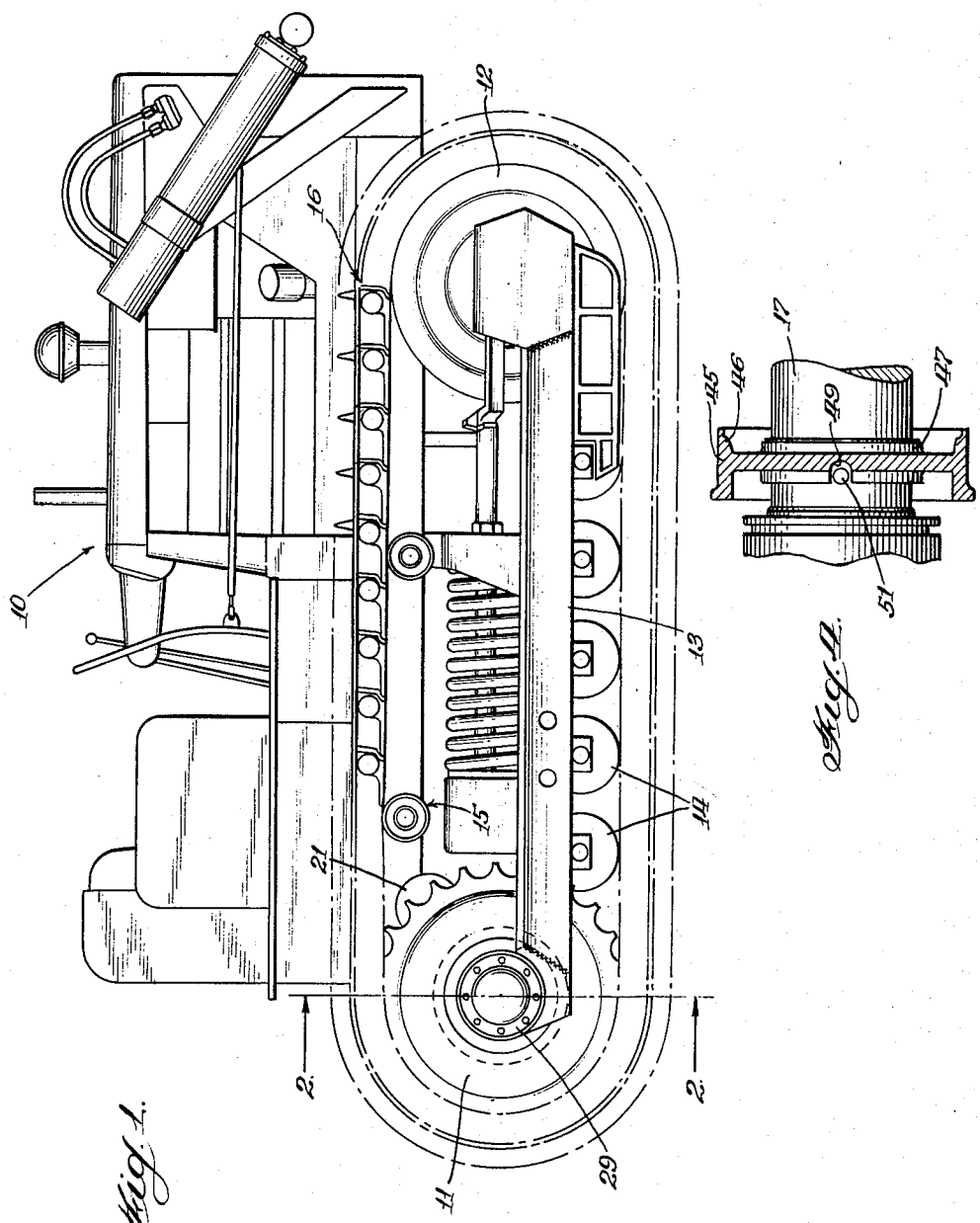
Figure 1 is a side elevational view of a crawler tractor.
Figure 2:
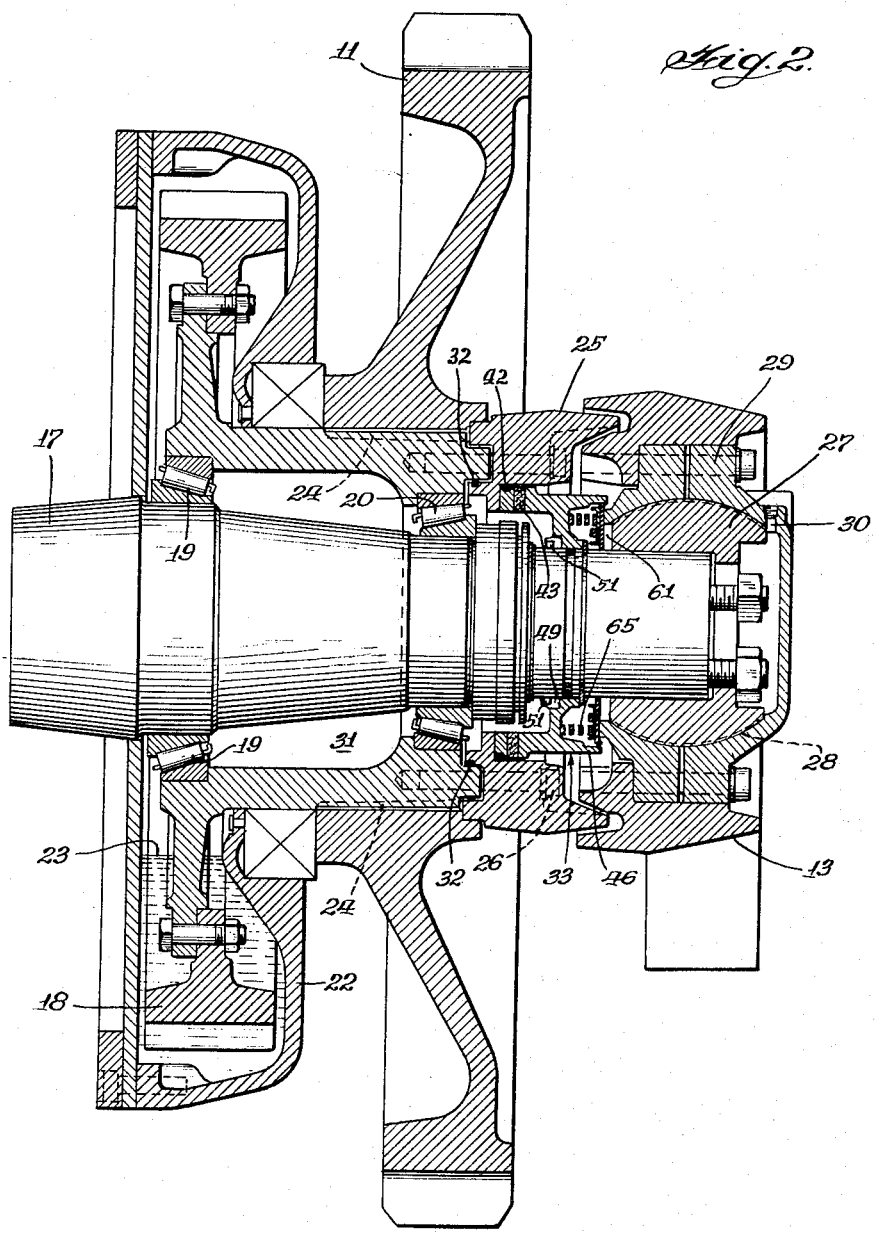
Figure 2 is a vertical sectional view taken on the line 2—2 of Figure 1.
Figure 3:
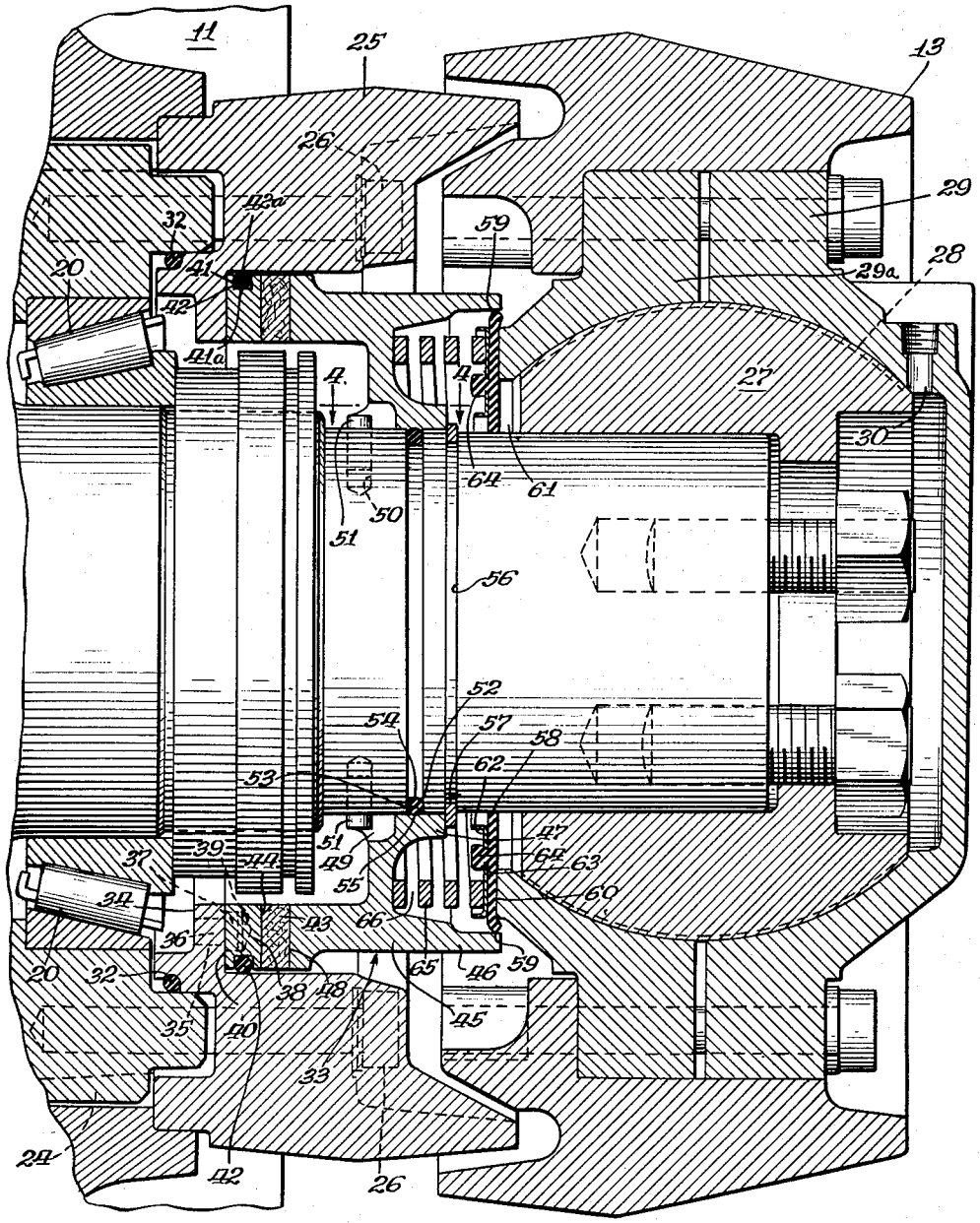
Figure 3 is an enlarged view of the sealing means and adjoining parts shown in Figure 2.

One type of seal used in the past is made up of a ring slidably mounted on a shaft and nonrotatably mounted on the shaft by means projecting from the hollow member. A mating ring is disposed on the shaft. The first named ring is urged against the mating ring by spring means. A diaphragm is secured to the first named ring and the hollow member. This seal has not been satisfactory because of frequent breakage of the diaphragm. Another type of seal used in the past is made up of a pair of rings spaced apart on a shaft by spring means. One of the rings is secured to the hollow member while the other ring floats on the shaft and has an annular groove in its outer face and a leather ring is disposed in the groove and secured in the groove by an adhesive. A diaphragm extends between and is fitted in the first and second named rings. This seal has not been satisfactory because of frequent breakage of the diaphragm and there has been considerable difficulty in getting the leather ring to stay secured to the metal ring. When the leather ring comes loose from the metal ring the seal is no longer any good.

The invention proposes sealing means between a shaft and a hollow member disposed on the shaft. The seal is comprised of a flange on the inner periphery of the hollow member and a circular wear member is disposed on the shaft and is supported by the flange for slidable movement longitudinally of the shaft. Sealing means are provided between the outer periphery of the circular wear member and the hollow member. A circular resilient member is disposed on the shaft against the wear member. Another circular member is slidably and nonrotatably mounted on the shaft and is disposed against the resilient member. Sealing means are provided between the shaft and the last named member. A resilient means bears against the last named member and urges all three members together. This seal has the advantages that it eliminates the use of a diaphragm and all parts of the seal are small and can be easily replaced. Thus no large expensive parts have to be replaced. This seal affords large surfaces where there is a lot of dirt present and with large surfaces there is less wear of the parts.

In the drawings, 10 generally designates a crawler vehicle or crawler tractor having a rear drive sprocket 11, a front idler wheel 12, a track frame 13, lower rollers 14, upper rollers 15 and an endless track 16 trained around the rear wheel drive sprocket, upper and lower rollers and the front idler wheel. The crawler tractor 10 has a stationary rear pivot shaft 17 and a spur gear 18 is rotatably mounted on the pivot shaft by means of spaced roller bearings 19 and 20. A pinion enclosed by housing 21 is connected to the transmission of the tractor and meshes with spur gear 18. The spur gear 18 is enclosed by a housing 22 containing oil up to a level 23. The rear drive sprocket 11 is splined on the hub of spur gear 18 as indicated at 24 and a retainer ring 25 holds the drive sprocket 11 on the hub of spur gear 18 and is secured to the hub of the spur gear by bolts 26. A spherical member 27 is secured to the outer end of the pivot shaft 17 and has spaced grooves 28 in its periphery. The track frame 13 is mounted for oscillatory movement on the spherical member 27 by track frame connecting members 29 and 29a encircling the spherical member 27 and secured to the rear end of the track frame. Member 29a also serves as and thereby constitutes a stop member or stop for the reaction of a spring 65. The track frame connecting member 29 has a passage 30 over which a lubricant gun is placed and grease is forced through the passage into the grooves 28 in the spherical member to fill the grooves and it also tends to flow out of the grooves. It will be seen that pivot shaft 17 and spherical member 27 are stationary while spur gear 18 and sprocket 11 and retainer ring 25 rotate. Rotation of spur gear 18 causes oil to be splashed through roller bearing 19 into space 31 between the pivot shaft 17 and the hub of the spur gear and this oil splashes through roller bearing 20, and a rubber O-ring 32 prevents escape of oil from between the hub of the spur gear and retainer ring 25. It will be seen that a seal must be provided between retainer ring 25 and connecting member 29a to prevent splashing of oil out between these parts. A seal must also be provided to prevent escape of grease out of grooves 28 in the spherical member between retainer ring 25 and track frame connecting member 29a. These two seals are combined into a single sealing means generally designated 33. The retainer ring 25 has a flange 34 on its inner periphery and the flange is provided with a pair of opposed holes 35. A pin 36 is press fitted in each of the holes 35 and each of the pins has a head 37. A circular metal wear member 38 is disposed about the pivot shaft 17 and has a pair of opposed recesses 39 which slidably receive the heads 37 of the pins and cause the member 38 to rotate with the retainer ring 25. It is difficult to grind the surface 40 of the flange 34 smooth and flat. The wear member 38 makes the condition of the surface 40 immaterial. The wear member 38 can be easily replaced thus preventing wear on the retainer ring 25 which is a large expensive main part. The wear member 38 is provided with an annular groove 41 and a resilient ring 42 in the form of an O-ring is disposed in this groove and the ring bears against the bottom of the groove to provide a sealing surface 41a and it also bears against the inner periphery of retainer ring 25 to provide a sealing surface 42a. A circular member 43 made of resilient material such as leather or cork is disposed about the pivot-shaft 17 and bears against wear member 38 to provide a sealing surface 44 between these members. The member 43 is lubricated at intervals by splashing of oil and since it is made of leather or cork it will soak up oil from the splashings and lubricate itself between splashings. It would not be desirable to make the member 43 of rubber since rubber will not soak up oil and therefore would not lubricate itself. In the case of metal mating parts the parts would have to be machined perfectly flat and leather or cork does not have to be made perfectly flat. A circular member 45 fabricated of metal is comprised of a sleeve 46 and a hub 47 of lesser length and diameter than the sleeve is disposed intermediate the ends of the sleeve and is integral therewith. The sleeve 46 of the circular member has one end disposed against the member 43 to provide a sealing surface 48. The hub 47 of the circular member is slidably mounted on the pivot shaft 17 and is provided with a pair of opposed notches 49. The pivot shaft 17 is provided with a pair of opposed recesses 50 and a pin 51 is press fitted in each recess. The notches 49 of the hub are disposed around pins 51 to slidably and nonrotatably mount the member 45 on the pivot shaft 17. The pivot shaft 17 is provided with an annular groove 52 and a resilient ring 53 in the form of a rubber O-ring is disposed in the groove. The ring 53 bears against the bottom of groove 52 to provide a sealing surface 54 and also bears against the inner periphery of the hub 47 of the circular member to provide a sealing surface 55. The pivot shaft 17 is provided with an annular groove 56 at the outer end of hub 47 and a snap ring 57 is disposed in the groove and holds the notches 49 about the pins 51 so that the notches will not be moved away from the pins during the assembly of the spherical member 27 on the rear axle 17. A resilient disk 58 made of rubber is disposed fairly loose on the pivot shaft 17 and its outer diameter is greater than the inner diameter of the sleeve 46 at that particular location along the sleeve to provide a sealing surface 59. The disk 58 is also disposed against the connecting member 29a to form a sealing engagement with an annular sealing surface 60 of such member and there is a space 61 between the disk and spherical member 27. A circular backing member 62 made of sheet metal is disposed about the pivot shaft 17 and has holes 63 arranged in spaced relation around a circle. The holes 63 receive tabs 64 on the disk 58 to attach the backing member 62 to the disk. A resilient means 65 in the form of a coil spring is disposed about the pivot shaft 17 and has one end disposed in an annular recess 66 formed between the hub and sleeve of member 45 and said one end bears against said member and its other end bears against the backing member 62. The coil spring 65 urges member 45 into contact with member 43 and member 43 in turn is urged into contact with member 38. The coil spring 65 also urges disk 58 against the track frame connecting member 29a. It will be seen that sealing surfaces are provided at 41a, 42a, 44, 48, 54 and 55 to prevent oil from splashing out between the retainer ring 25 and connecting member 29a. The sealing surfaces 44 and 48 are large surfaces where a lot of dirt is present and when the surfaces are large there is less wear of the parts. Grease moves out of the grooves 28 in the spherical member and gets past the inner periphery of disk 58 and the pivot shaft 17 into the space where coil spring 65 is located. The sealing surface 59 prevents the grease from moving out of the space where coil spring 65 is located and sealing surface 60 prevents the grease from moving out of grooves 28 between the connecting member 29a and disk 58.

What is claimed is:

1. Sealing means between a shaft having a stop encircling such shaft and a hollow member also encircling the shaft, comprising a flange on the inner periphery of the hollow member, a first circular wear member disposed about the shaft and supported by the flange for movement longitudinally of the shaft and the outer periphery of such member being provided with an annular groove, a first resilient ring disposed in the groove in the first circular member and providing a sealing surface between the bottom of the groove and the ring and a sealing surface between the ring and the hollow member, a resilient second circular member disposed about the shaft against the first circular member, an annular groove in the shaft, a second resilient ring disposed in the groove in the shaft, a third circular member comprising a sleeve and a hub of lesser diameter and length than the sleeve disposed interiorly of the sleeve intermediate the ends thereof and secured to the sleeve and one end of the sleeve being disposed against the second circular member and the hub being slidably and nonrotatably mounted on the shaft, the bottom of the groove in the shaft and the second resilient ring providing a sealing surface and the second resilient ring and the hub of the third circular member providing a sealing surface, and resilient means disposed on the shaft and having one end reacting against the third circular member and having its other end reacting against the stop to urge the third circular member into contact with the resilient second circular member and the resilient second circular member into contact with the first circular wear member so that sealing surfaces are provided between the first and second circular members and the second and third circular members.

2. Sealing means between a shaft having a stop encircling such shaft and a hollow member also encircling the shaft, comprising a flange on the inner periphery of the hollow member, spaced pins mounted on the flange and projecting therefrom, a first circular wear member provided with spaced recesses and disposed about the shaft with the recesses slidably receiving the pins and the outer periphery being provided with a first annular groove, a first resilient ring disposed in the groove in the first circular member and providing a sealing surface between the bottom of the groove and the ring and a sealing surface between the ring and the hollow member, a resilient second circular member disposed about the shaft against the first circular member, an annular groove in the shaft, a second resilient ring disposed in the groove in the shaft, spaced pins mounted in the shaft between the second circular member and the second resilient ring, a third circular member comprising a sleeve and a hub of lesser diameter and length than the sleeve disposed interiorly of the sleeve intermediate the ends thereof and secured to the sleeve and one end of the sleeve being disposed against the second circular member and the adjacent end of the hub being provided with spaced notches slidably receiving the pins on the shaft, the bottom of the groove in the shaft and the second resilient ring providing a sealing surface and the second resilient ring and the hub of the third circular member providing a sealing surface, and resilient means disposed about the shaft and having one end bearing against the third circular member and having its other end reacting against the stop to urge the third circular member into contact with the resilient second circular member and the resilient second circular member into contact with the first circular wear member so that sealing surfaces are provided between the first and second circular members and between the second and third circular members.

References Cited in the file of this patent

UNITED STATES PATENTS

| | | |
|---|---|---|
| 1,366,879 | Dennedy | Jan. 25, 1921 |
| 1,878,804 | Baker et al. | Sept. 20, 1932 |
| 2,148,093 | Wheeler | Feb. 21, 1939 |
| 2,233,599 | Gilbert | Mar. 4, 1941 |
| 2,661,967 | Mitchell | Dec. 8, 1953 |
| 2,685,463 | Pollard | Aug. 3, 1954 |

FOREIGN PATENTS

| | | |
|---|---|---|
| 517,863 | France | Dec. 22, 1920 |